United States Patent
Bohlender

(10) Patent No.: US 8,753,122 B2
(45) Date of Patent: Jun. 17, 2014

(54) SMOKE SIMULATOR SYSTEM FOR AIRCRAFT COCKPIT

(75) Inventor: Peter Bohlender, Linsengericht (DE)

(73) Assignee: Airbus Helicopter Deutscland GmbH, Donauwoerth (DE)

( * ) Notice: Subject to any disclaimer, the term of this patent is extended or adjusted under 35 U.S.C. 154(b) by 106 days.

(21) Appl. No.: 13/240,741

(22) Filed: Sep. 22, 2011

(65) Prior Publication Data
US 2012/0156654 A1 Jun. 21, 2012

(30) Foreign Application Priority Data
Dec. 20, 2010 (EP) .................................... 10400062

(51) Int. Cl.
*G09B 9/00* (2006.01)
(52) U.S. Cl.
USPC ........................................ 434/30; 239/102.2
(58) Field of Classification Search
USPC ................................................. 434/30, 226
See application file for complete search history.

(56) References Cited

U.S. PATENT DOCUMENTS

| | | | | | |
|---|---|---|---|---|---|
| 3,005,267 | A | * | 10/1961 | Decker | 434/30 |
| 4,573,877 | A | * | 3/1986 | Baumberg | 417/76 |
| 5,246,633 | A | * | 9/1993 | Teng | 261/36.1 |
| 5,345,830 | A | * | 9/1994 | Rogers et al. | 73/866 |
| 5,415,551 | A | * | 5/1995 | Semenza | 434/226 |
| 5,678,614 | A | * | 10/1997 | Grantham | 141/59 |
| 5,823,784 | A | * | 10/1998 | Lane | 434/226 |
| 6,129,552 | A | * | 10/2000 | Deshoux et al. | 434/226 |
| 6,361,024 | B1 | * | 3/2002 | Carson | 261/30 |
| 7,748,983 | B2 | * | 7/2010 | Blackburn et al. | 434/226 |
| 7,810,741 | B2 | * | 10/2010 | Kowalski et al. | 238/2 |
| 7,810,742 | B2 | * | 10/2010 | Levi | 239/102.2 |
| 2007/0172801 | A1 | * | 7/2007 | Darois et al. | 434/226 |
| 2007/0218436 | A1 | | 9/2007 | Blackburn | |
| 2010/0108777 | A1 | * | 5/2010 | O'Brien | 239/8 |
| 2010/0170452 | A1 | * | 7/2010 | Ford et al. | 122/14.21 |
| 2011/0141207 | A1 | * | 6/2011 | Fost et al. | 347/84 |

FOREIGN PATENT DOCUMENTS

| | | |
|---|---|---|
| EP | 1324292 A2 | 7/2003 |
| FR | 2843889 A1 | 3/2004 |
| FR | 2846562 A1 | 5/2004 |
| GB | 2281269 A | 8/1994 |
| WO | 03063664 A1 | 8/2003 |

OTHER PUBLICATIONS

Search Report and Written Opinion; Application No. EP 10400062 dated: May 30, 2011.

* cited by examiner

*Primary Examiner* — Sam Yao
*Assistant Examiner* — Peter J Alley
(74) *Attorney, Agent, or Firm* — Brooks Kushman P.C.

(57) ABSTRACT

A smoke simulator system (1) for an aircraft simulator cockpit said system (1) comprising a water tank (2), an ultrasonic generator (3), said ultrasonic generator (3) being inside said water tank (2), supply means (7) to said water tank (2) and outlet means (8) from said water tank (2) for smoke. The invention relates as well to a method to operate such a smoke simulator system (1) for an aircraft simulator cockpit.

18 Claims, 1 Drawing Sheet

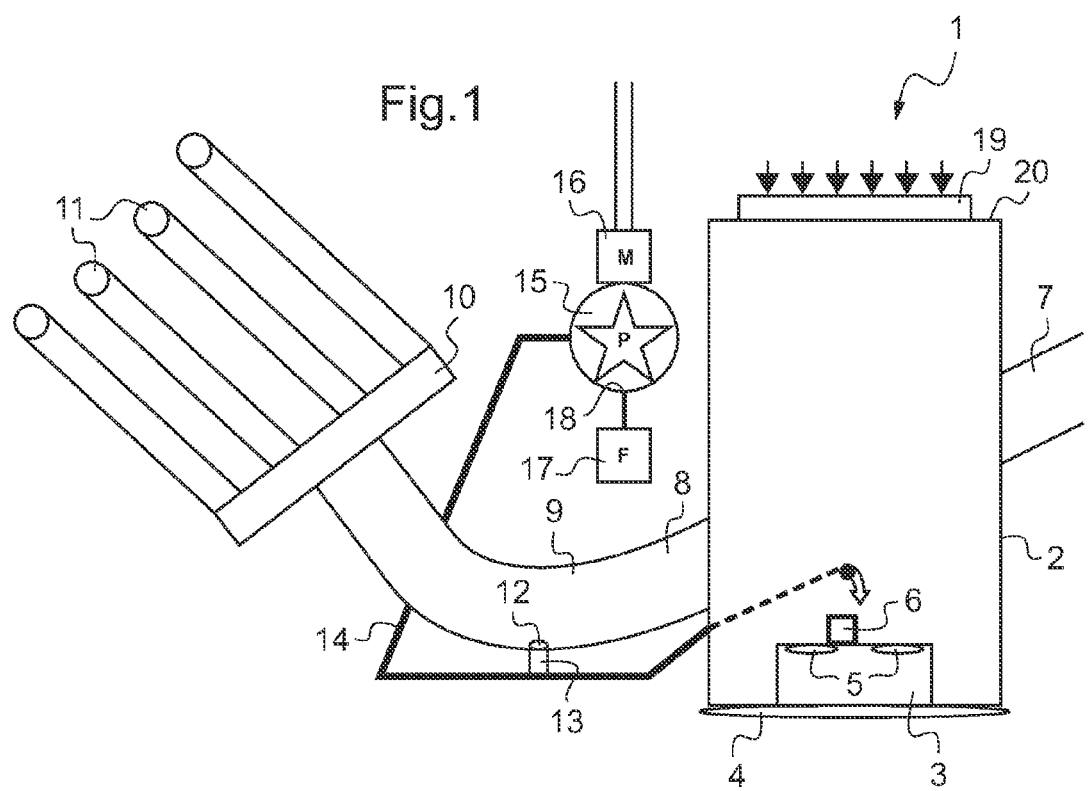
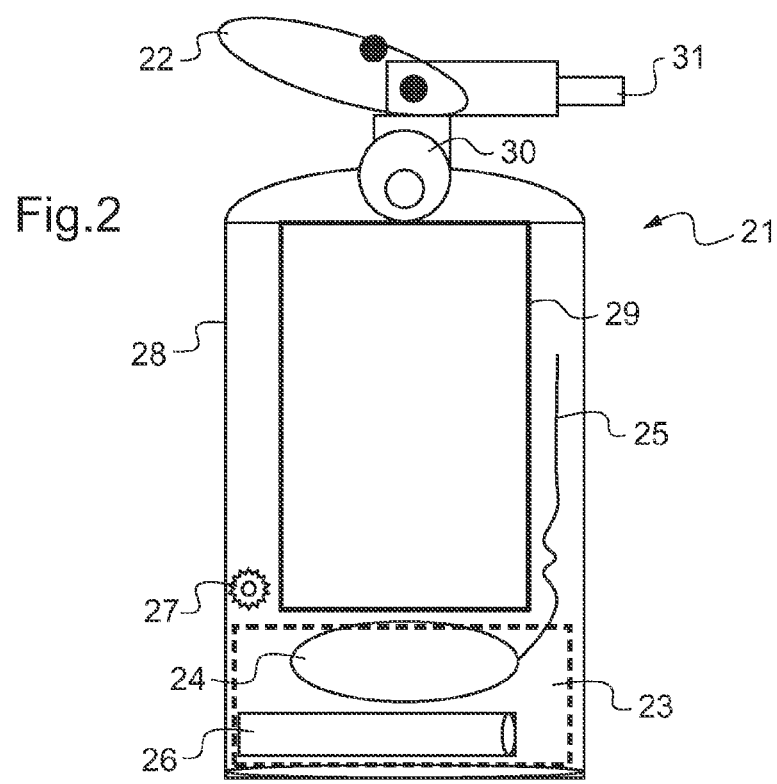

SMOKE SIMULATOR SYSTEM FOR AIRCRAFT COCKPIT

CROSS REFERENCE TO RELATED APPLICATION

This application claims priority to European Patent Application No. 10 400062.5 filed on Dec. 20, 2010, the disclosure of which is incorporated in its entirety by reference herein.

BACKGROUND OF THE INVENTION (1) Field of the Invention

The invention relates to a smoke simulator system for an aircraft cockpit with the features of the preamble of claim 1 and a method of operating such a system with the features of the preamble of claim 13.

(2) Description of Related Art

A standard emergency situation to be trained by pilots of aircrafts is a fire alarm on board. Up to now real fire simulation inside the cockpit was not possible and any simulation of an on board fire alarm was effected only by warning lights in the aircraft's cockpit. Any real feeling and the visual conditions inside the cockpit and/or crew rooms, such as view to instruments, emergency exits etc., could not be simulated.

The document FR 2846562 discloses a fire simulator with a vertical bin simulating flames by strips of a reflective fabric that wave in an air flow created by fans. The lower part of the bin incorporates a liquid smoke container, a pump, an electric motor and a sound source that reproduces the crackling of a fire. The intensity of a simulated fire can be varied according to the way in which fire extinguishers are operated.

The document FR 2843889 discloses a training system for fire fighters comprising a furnace consisting of a gas burner, which is submerged in water in a tank, means of conveying a combustible gas mixture to said burner and an electrode to ignite the gas at the beginning of a drill. The system is also provided with an ignition system comprising a casing which is positioned close to the aforementioned tank, the inner space thereof being thermally protected, and which is equipped with a heat-resistant tube, the free end of said tube being disposed at a short distance above the surface of the water in the tank. Combustible gas mixtures in combination with a burner imply safety risks.

The document WO 03063664 A1 discloses an electrical heating apparatus incorporating a smoke effect apparatus having a container for liquid, an ultrasonic transducer submerged in liquid within the container and an apertured bed located above the transducer. When the transducer is actuated, clouds of water vapour resembling smoke are produced. The clouds of water vapour are drawn upwardly in a current of air induced by a fan heater located above the apertured bed, which gives the impression that smoke is originating from the bed in the manner of a fire.

The document U.S. Pat. No. 6,129,552 A discloses an installation with a screen of large size on which varying images are displayed representing a fire in a sequence under the control of a computer, the person performing the exercise having available modified fire extinguisher devices delivering a virtual jet whose point of impact on the screen can be located, with corresponding information being transmitted to the computer.

The document US 2007218436 A1 discloses methods and apparatus for use in fire extinguisher training implemented electronically without the need for an open flame. The training apparatus includes a display having a plurality of light sources adapted to display a varying light pattern simulating a dynamic flame; a sensor adapted to detect a stimulus emitted by one of a fire extinguisher and a fire extinguisher simulator and output a signal corresponding to the detected stimulus; and one or more processors adapted to receive the output from the sensor and vary the light pattern simulating the dynamic flame on the display in response to the stimulus detected by the sensor.

The document GB 2281269 A discloses a transportable safety training apparatus comprising a reinforced shell simulating an aircraft body and fitted at least with doors and internal seating in positions appropriate to that body, the shell having legs, which may be adjustable, for supporting it on the ground in various different attitudes and lifting points for connection to means for lifting it either to change its attitude or onto a transporter. The interior of the shell may be provided with fittings (e.g. bulkheads, instrument panels etc) resembling an actual aircraft, together with systems simulating smoke and fuel leaks.

The EP1 324 292 A2 discloses a simulator comprising a chamber, visibility-impairing devices connected to the chamber, and orientation devices and rescue devices arranged in the chamber. The visibility-impairing devices include a device for producing smoke, especially a vaporizer for vaporizing a smoke product. This state of the art is used to train users of tunnels, such as car drivers.

SUMMARY OF THE INVENTION

It is an object of the present invention to provide a smoke simulator system for an aircraft cockpit and a method of operating such a system.

The solution is provided with a smoke simulator system for an aircraft cockpit with the features of claim 1 of the invention and a method of operating such a system with the features of claim 13. Preferred embodiments of the invention are described in the subclaims.

According to the invention a smoke simulator system for an aircraft cockpit, particularly a helicopter cockpit or crew rooms, comprises a water tank and a generator for ultrasonic waves mounted inside said water tank. Supply means for feeding water into said water tank and electrical energy to said generator for ultrasonic waves are provided at the water tank. Outlet means are provided at the water tank to drain smoke produced by the generator for ultrasonic waves from water inside said water tank. The smoke created according to the invention improves simulation by giving a realistic feeling and the visual conditions inside a cockpit and/or crew rooms with respect to instruments emergency exits, etc. in case of a fire on board. Hence a higher training performance for the pilots/crew staff is achieved with the inventive system due to higher level of fire simulation. An advantage of the system according to the invention is that the smoke generated is harmless and heavier than air; thus said smoke remains next to a floor of the cockpit and will therefore most probably not activate any real smoke detectors inside the cockpit/cabin area. Said heavy smoke generated by the system according to the invention can be evacuated fast from the floor and a pilot can train to evacuate the smoke and after this the pilot may go on with further exercises within a relatively short interval. The volume and/or the intensity of the smoke can be regulated easily. The inventive system doesn't need any warm-up but starts directly after being switched on.

According to a preferred embodiment of the invention the ultrasonic generator is located at the bottom of the water tank inside a water sump.

According to a further preferred embodiment of the invention the ultrasonic generator is driven by low current.

According to a further preferred embodiment of the invention the smoke generation is effected by use of a triple head ultrasonic generator for improved transfer of distilled water to smoke.

According to a further preferred embodiment of the invention the outlet means are connected to an extension tube with at least one sump drain hole provided at a lowest area of said extension tube to collect condensate resulting from the smoke precipitation inside the extension tube and installed smoke outlet tubes.

According to a further preferred embodiment of the invention the sump drain hole is connected via a Venturi T-fitting to an airtube reaching into the water tank above diaphragm discs of the ultrasonic-generator, said air pump being driven by an electric diaphragm pump to provide enough pressure in the airtube to reach a Venturi effect in the Venturi T-fitting for transfer of condensate from the sump at the lowest area of the extension tube to the water tank, said transfer enriching the smoke produced by the diaphragm discs of the ultrasonic-generator to stabilize intensity and density of the smoke.

According to a further preferred embodiment of the invention, the airfilter is fitted to an inlet port of the electric diaphragm pump to reduce noise and to clean the air used inside the system.

According to a further preferred embodiment of the invention a fan is installed in a top cover of the water tank to allow—preferably remotely controlled—generation of supplemental pressure to press the smoke from the outlet port further through manifold tubes of a manifold to route the smoke to predetermined locations inside the cockpit. A pre defined rerun of the fan after smoke switch off will dry the outlet tubes and cool down the system.

According to a further preferred embodiment of the invention a microcontroller is provided to control the operation of air pump, fan and ultrasonic generator for customized smoke production according to an air volume of the cockpit, and an automatic maintenance program to allow drying, cooling and cleaning of the system. The microcontroller has a time relay or time relays.

According to a further preferred embodiment of the invention a remote receiver circuit is provided to switch off the system if there is a simulated fire activated inside the cockpit.

According to a further preferred embodiment of the invention an original cabin/cockpit fire extinguisher is provided with a remote trigger function to switch off the system with a trigger switch actuated by the agent release handle, said fire extinguisher being equipped with an electronic chamber with a remote module and an output to an antenna to communicate any signal from the trigger switch via the remote module and the antenna.

According to a further preferred embodiment of the invention the fire extinguisher comprises a pressure tank and a pressure gage indicating the pressure in the pressure tank. Pressurized air can be delivered from the pressure tank through the nozzle if the handle is actuated to have the original sound of extinguishing.

According to a preferred embodiment of the invention a method of operating the system is characterized by filling distilled water into the water tank to entirely submerge the ultrasonic-generator, supplying low current electric energy to the ultrasonic-generator, switching on the ultrasonic-generator to produce smoke by means of the submerged diaphragm discs of the ultrasonic-generator and discharging the smoke through the outlet port of the water tank.

According to a further preferred embodiment of the invention a fan is actuated inside the top cover of the water tank to produce supplemental pressure inside said water tank to press the smoke from the outlet port further through the manifold tubes of the manifold to route the smoke to predetermined locations inside the cockpit.

According to a further preferred embodiment of the invention water condensation is collected next to a sump drain hole in the extension tube and said water condensation is pumped back into the water tank via an airtube using a Venturi effect to submerge the ultrasonic-generator entirely in the water sump of the water tank.

According to a further preferred embodiment of the invention the system is switched off with either its remote receiver circuit and/or by the fire extinguisher with its installed remote switch. Improved simulation is achieved when the handle of the fire extinguisher is actuated by the pilot/crew and the air filling compressed in the pressure tank of the fire extinguisher is ejected through the nozzle to stop the smoke in the cockpit like in a real fire fighting process.

BRIEF DESCRIPTION OF THE DRAWINGS

Preferred embodiments of the invention are described in the following description with reference to the attached drawings.

FIG. 1 shows a schematic view of a smoke simulator system for an aircraft cockpit according to the invention, and FIG. 2 shows a schematic view of an element of the smoke simulator system of FIG. 1.

DETAILED DESCRIPTION OF THE PREFERRED EMBODIMENTS

According to FIG. 1 a smoke simulator system 1 for an aircraft cockpit (not shown) comprises a water tank 2 with the shape of a circular tube. The diameter of said water tank 2 is about 100 mm. The water tank 2 is water tight and made of plastic material.

An ultrasonic-generator 3 is located inside the water tank 2 on a lower cover 4. The lower cover 4 is tightened by means of a gasket to the water tank 2. The ultrasonic-generator 3 is provided with diaphragm discs 5 for generating ultrasonic waves. In operation of the system 1 the ultrasonic-generator 3 is submerged with its diaphragm discs 5 inside a water sump. A fluid sensor 6 is provided to detect the water level above the diaphragm discs 5 of the ultrasonic-generator 3. A common tuning of the system 1 will be that the water level in the water tank 2 is at least 20 mm above the diaphragm discs 5 of the ultrasonic-generator 3; an automatic switch off function (not shown) will be activated by the fluid sensor 6 if the water level goes below said minimum.

The water tank 2 is provided with supply means 7 such as a cable port pointing upward. Said cable port 7 may be used to refill distilled water a little enriched with special nontoxic fog fluid. Said cable port 7 may be used as well as an inspection hole for the water tank 2. Outlet means 8 such as an outlet port of the water tank 2 comprise an extension tube 9 and a manifold 10 with four manifold tubes 11 serving as smoke outlet. Said extension tube 9 is pointing up about 45° from the outlet port 8 and has a diameter of approximately 70 mm.

A sump drain hole 12 is provided at a lowest area of the extension tube 9. A Venturi T-fitting 13 is installed with its inlet side in the sump drain hole 12. An airtube 14 is connected to an outlet side of the Venturi T-fitting 13 said airtube 14 reaching into the water tank 2 above the diaphragm discs 5 of the ultrasonic-generator 3. An air pump 15 driven by an electric diaphragm pump 16 provides enough pressure in airtube 14 to reach a Venturi effect in the Venturi T-fitting 13 for transfer of condensate from the sump at the lowest area of the extension tube 9 to the water tank 2. An airfilter 17 is fitted on an inlet port 18 of the electric diaphragm pump 16.

A fan 19 is installed in a top cover 20 on top of the water tank 2.

A microcontroller (not shown) is provided with a time relay (or time relais) to control the operation of system 1 for customized smoke production according to the situation and any air volume of the cockpit and a predefined maintenance cleaning program. A remote receiver circuit (not shown) is provided to switch off system 1 if there is an input from the simulator extinguisher or a real fire alarm.

According to FIG. 2 a fire extinguisher 21 is provided with a remote trigger function to switch off system 1 with a trigger switch (not shown) if a discharge valve of said fire extinguisher 21 is actuated by a handle 22. The fire extinguisher 21 is equipped with an electronic chamber 23 with a remote module 24 and an output to an antenna 25. The signal from the trigger switch is communicated via the remote module 24 and the antenna 25. A battery 26 is provided for supply of the remote module 24. A charge connector 27 in the casing 28 of the fire extinguisher 21 is connected to the battery 26 for charging.

The fire extinguisher 21 comprises a pressure tank 29 and a pressure gage 30 indicating the pressure in the pressure tank 29. Pressurized air can be delivered from the pressure tank 29 through nozzle 31 if handle 22 is actuated. A normal cockpit rotorcraft/aircraft fire extinguisher may be modified to comprise the features described before and marked with a label to be used as "For simulation only".

The system 1 comprises a supplemental control via simulation computers (not shown).

A Method to Operate System 1

Distilled water is filled into the water tank 2 via the cable port 7 till the ultrasonic-generator 3 is entirely submerged. Low current electric energy is supplied to the ultrasonic-generator 3. The ultrasonic-generator 3 is switched on and the smoke produced by the submerged diaphragm discs 5 of the ultrasonic-generator 3 is discharged through the outlet port 8 of the water tank 2 by its gravity because the generated smoke is heavier than the ambient air.

The fan 19 inside the top cover 20 is actuated to produce supplemental pressure to press the smoke from the outlet port 8 further through the manifold tubes 11 of manifold 10 to route the smoke to predetermined locations inside the cockpit. Water condensation in the extension tube 9 due to smoke generation is collected next to a sump drain hole 12 and pumped back via an airtube 14 using a Venturi effect to the water sump submerging the ultrasonic-generator 3.

If system 1 is not switched off by means of its remote receiver circuit the special cockpit fire extinguisher 21 may be actuated with its installed remote switch. When the handle 22 of the special cockpit fire extinguisher 21 is actuated the air filling compressed in the pressure tank 29 is ejected through the nozzle 31 to stop the smoke with real discharge sound like in a real fire fighting process. A signal is provided from the trigger switch after actuation of the handle 22 and said signal is sent by means of the remote module 24 and the antenna 25 to switch off system 1.

What is claimed is:

1. A smoke simulator system for being installed onboard an aircraft to reproduce a simulated fire, said system comprising
a water tank having a lower cover and a top cover,
an ultrasonic generator on the lower cover having diaphragm discs, said ultrasonic generator being inside said water tank,
supply means for filling water to said water tank and supplying electrical current to the smoke simulator system,
outlet means for smoke from said water tank, having an extension tube connected to the water tank, an outlet manifold connected to and extending away from the extension tube and manifold tubes connected to the outlet manifold to serve as smoke outlets, the extension tube having at least one sump drain hole provided at a lowest area of said extension tube in a water sump formed by the tube,
an airtube reaching into the water tank above the diaphragm discs of the ultrasonic generator, the ultrasonic generator being supplied with electrical current by the supply means,
a fan being installed in the top cover of the water tank and being supplied with electrical current by the supply means,
a Venturi T-fitting connecting the sump drain hole to the airtube,
an air pump supplied with electrical current by the supply means, the air pump driven by an electric diaphragm pump to provide enough pressure in the airtube to reach a Venturi effect in the Venturi T-fitting for transfer of condensate from the water sump at the lowest area of the extension tube to the water tank, and
a microcontroller supplied with electrical current by the supply means, the microcontroller configured to control the operation of the system for customized smoke production according to an air volume onboard the aircraft where the system is installed.

2. The system according to claim 1, wherein the ultrasonic generator is located at the bottom of the water tank inside a water sump.

3. The system according to claim 1, wherein the ultrasonic generator is provided with a triple head to transfer water to smoke.

4. The system according to claim 1, wherein an airfilter is fitted on an inlet port of the electric diaphragm pump.

5. The system according to claim 1, wherein the microcontroller comprises a time relay and predefined maintenance programs.

6. The system according to claim 1, wherein a remote receiver circuit is provided.

7. The system according to claim 1, wherein a fire extinguisher is provided with a remote trigger function with a trigger switch actuated by a handle, said fire extinguisher comprising an electronic chamber with a remote module and an output to an antenna.

8. The system according to claim 1, wherein a fire extinguisher comprises a pressure tank and a pressure gage indicating the pressure in the pressure tank.

9. A method of operating the system according to claim 1, comprising:
filling water into the water tank to entirely submerge the ultrasonic-generator,
supplying low current electric energy to the ultrasonic-generator,
switching on the ultrasonic-generator to produce smoke by means of the submerged diaphragm discs of the ultrasonic-generator and
discharging the smoke through the outlet means of the water tank.

10. The method according to claim 9, further comprising actuating and regulating a fan inside a top cover of the water tank to produce supplemental pressure to press the smoke from the outlet means further through tubes of a manifold and to route the smoke to predetermined locations inside the cockpit.

11. The method according to claim 9, further comprising:
- collecting water condensation in the extension tube next to the sump drain hole and
- pumping said condensation back into the water tank via the airtube using the Venturi effect.

12. The method according to claim 9, further comprising switching off the system with either its remote receiver circuit or a fire extinguisher with its installed remote switch by providing a signal from a trigger switch.

13. The method according to claim 12, further comprising running of a fan after switching off the smoke.

14. The method according to claim 9, further comprising running predefined maintenance programs by means of a microcontroller.

15. A smoke simulator system for configured to be installed in an aircraft cockpit, said system comprising:
- a water tank having a lower cover and a top cover connected by a side wall and a cable port for feeding water into the tank, the side wall defining an outlet port spaced apart from the top cover to drain smoke from the water tank,
- an ultrasonic generator having diaphragm discs, said ultrasonic generator being inside said water tank on the lower cover of the tank,
- an extension tube connected to the outlet port to receive smoke from the water tank, the extension tube being bent to provide a water sump at a lowest area of the tube, the extension tube having a sump drain hole provided at the lowest area, a manifold connected to and extending away from the extension tube with a plurality of manifold tubes connected to and extending away from the extension tube and serving as a smoke outlet
- a fan connected to the top cover of the water tank to produce supplemental pressure to press the smoke through the outlet port and to the extension tube,
- an airtube connected to the side wall of the water tank above the diaphragm discs of the ultrasonic generator,
- a Venturi T-fitting connecting the sump drain hole to the airtube, and
- an air pump connected to the air tube and driven by an electric diaphragm pump to provide enough pressure in the airtube to reach a Venturi effect in the Venturi T-fitting for transfer of condensate from the water sump of the extension tube to the water tank.

16. The system of claim 15 wherein an end of the extension tube connected to the manifold is oriented generally 45° upwards from the outlet port.

17. The system of claim 15 wherein the extension tube has a first end connected to the outlet port and a second end connected to the manifold, the extension tube having an intermediate section between the first and second ends, wherein the extension tube is bent in the intermediate section to provide the water sump.

18. The system of claim 15 wherein the Venturi T-fitting has an inlet side connected to the sump drain hole and an outlet side connected to the airtube.

* * * * *